United States Patent [19]
Nishijima et al.

[11] Patent Number: 5,862,119
[45] Date of Patent: Jan. 19, 1999

[54] DISC INCLINING/DISC INVERTING MECHANISM IN A DISC STORAGE/PLAYBACK APPARATUS

[75] Inventors: Tatsumi Nishijima, Hiratsuka; Kyuichiro Nagai, Fujisawa; Tomomi Okamoto, Chigasaki; Ikuo Nishida, Ebina; Kouhei Takita, Hiratsuka, all of Japan

[73] Assignee: Hitachi, Ltd., Tokyo, Japan

[21] Appl. No.: 663,985

[22] Filed: Jun. 14, 1996

[30] Foreign Application Priority Data

Jun. 14, 1995 [JP] Japan .................................. 7-147729
Mar. 5, 1996 [JP] Japan .................................. 8-047436

[51] Int. Cl.$^6$ .................................................. G11B 17/04
[52] U.S. Cl. .......................................................... 369/192
[58] Field of Search ........................ 369/36, 75.1, 77.1, 369/77.2, 178, 191, 192, 219, 199, 200; 360/92, 98.06, 98.04

[56] References Cited

U.S. PATENT DOCUMENTS

| | | | |
|---|---|---|---|
| 4,899,326 | 2/1990 | Takeya et al. | 369/36 |
| 4,947,273 | 8/1990 | Benz | 360/98.06 |
| 5,285,333 | 2/1994 | Barr et al. | 369/192 |
| 5,392,266 | 2/1995 | Kobayashi et al. | 369/36 |
| 5,465,381 | 11/1995 | Schmidt et al. | 360/133 |

Primary Examiner—George J. Letscher
Attorney, Agent, or Firm—Antonelli, Terry, Stout & Kraus, LLP

[57] ABSTRACT

In an auto-exchanger disc apparatus, both a disc cartridge for stocking plural discs and a pickup cartridge having a pickup are provided with common recesses, and a cartridge stocking unit is formed with a projection which is engaged with the recesses, whereby the cartridges can be exchanged for each other and mounted on the disc apparatus. Therefore, the extension and maintenance of the cartridges can be facilitated. When a double-side reproducing operation is performed, the pickup cartridge is turned upside down and then mounted on the disc apparatus, whereby the double-side reproduction can be surely performed by the disc inverting mechanism. Further, disc inclining means is provided to prevent a disc being returned from the disc feeder to the disc cartridge from abutting against the disc cartridge. The disc inclining mechanism and the disc inverting means may be integrally constructed by the same member to reduce the cost. Still further, a cleaning member is provided to some or all of the rollers for feeding the disc to perform a disc cleaning operation as well as a disc feeding operation, thereby preventing dust from being attached to the disc.

2 Claims, 10 Drawing Sheets

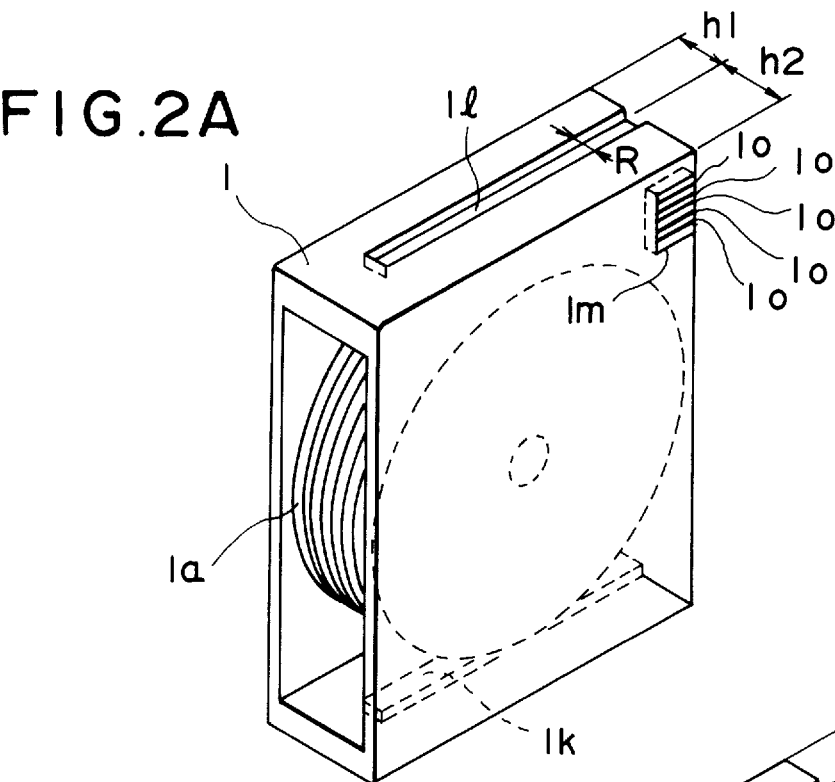
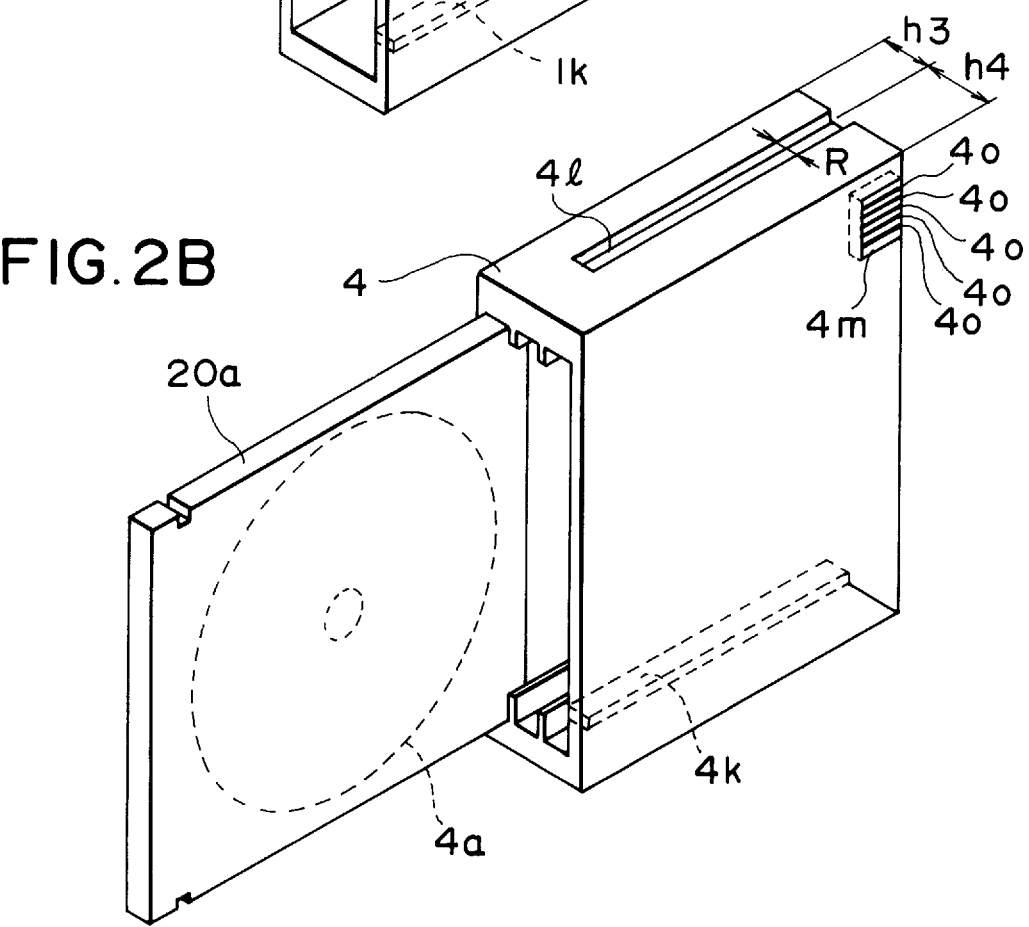

DISC INCLINING/DISC INVERTING MECHANISM IN A DISC STORAGE/PLAYBACK APPARATUS

BACKGROUND OF THE INVENTION

1. Field of the Invention

The present invention relates to an auto-changer type disc apparatus for pulling out a desired disc from a disc stocking unit in which plural discs are stocked (accommodated), and for recording/reproducing information signals on/from the disc, and particularly to an improvement in operation performance of the apparatus, stabilization of the take-in/take-out operation of the disc into/from the disc stocking unit, recording/reproducing on/from both sides of a disc, and cleaning the surface of the disc.

2. Description of Related Art

As an example of this type disc apparatus, there is known an apparatus including a disc stocking unit in which plural discs are piled up, a hand unit for pulling out a desired disc from the disc stocking unit, and plural disc reproducers (pickup units) for reproducing the selected disc as disclosed in Japanese Laid-open Patent Application No. Hei-5-182343.

Further, as a disc apparatus used for recording/reproducing on/from both sides of a disc (hereinafter referred to as double-side disc apparatus), there is known an apparatus in which drives (pickup units) for recording/reproducing information on/from obverse and back surfaces of a disc respectively are individually and separately provided in the apparatus to thereby omit an inverting mechanism as disclosed in Japanese Laid-open Patent application No. Hei-5-314626.

As described above, the conventional disc apparatus as disclosed in Japanese Laid-open Patent Application No. Hei-5-182343 is designed so that plural pickup units are fixedly mounted in the disc apparatus. Accordingly, for example, when a pickup unit is required to be taken out from the apparatus and repaired due to failure of the pickup unit, it is necessary to dismantle the apparatus. Therefore, this type of disc apparatus is inconvenient from the point of view of maintenance to users.

With the double-side disc apparatus as described in Japanese Laid-open Patent application No. Hei-5-314626, for example, in the case where the obverse side of a disc is recorded/reproduced by the pickup unit for the obverse side while the back side of the disc is not recorded/reproduced by the pickup unit for the back side, and a request to record/reproduce the obverse side of another disc is made, this type of disc apparatus cannot satisfy this request.

Furthermore, these disc apparatuses, particularly a disc apparatus having a disc stocking unit for stocking a number of discs, plural pickup units and a disc feeding unit for feeding a disc between the pickup units, have the following disadvantage. If a disc being fed by the disc feeding unit is inclined at a large angle with respect to other discs which are stocked in the disc stocking unit, there frequently occurs a case where the disc being returned from the disc feeding unit to the disc stocking unit abuts against a member constituting the disc stocking unit, and the disc return operation fails. In order to avoid these problems, the operation is required to be stabilized.

In addition, in the conventional disc apparatus as disclosed in Japanese Laid-open Patent Application No. Hei-5-314626, the discs are stocked in a case, and thus there is no problem with attachment of dust, mote, etc. onto the discs. However, when a disc is handled, particularly in a case of a disc apparatus which is designed so that a high-density disc DVD (Digital Versatile Disc) is handled without being stocked in a case, a dust protective treatment is preferably conducted on the disc to prevent dust, mote, etc., which are frequently the cause of dropout, from being attached onto the disc.

SUMMARY OF THE INVENTION

A first object of the present invention is to provide a disc apparatus in which maintenance and operation performance can be maintained at an excellent level even when plural disc stocking units and plural pickup units are mounted in the disc apparatus.

A second object of the present invention is to provide a disc apparatus which is equipped with plural pickup units and in which recording and reproduction can be performed on both sides of a disc with no problem.

A third object of the present invention is to provide a disc apparatus equipped with plural disc stocking units and plural pickup units, and in which a disc take-in and take-out operation performed between each disc stocking unit and each pickup unit can be stabilized.

A fourth object of the present invention is to provide a disc apparatus for handling discs without stocking the discs in a case, in which attachment of dust, mote, etc. to the discs can be prevented to enhance the reliability of the disc apparatus.

In order to attain the first object, the disc apparatus includes a medium cartridge (disc cartridge) for stocking plural media, a medium feeding unit for pulling out a desired medium from the medium cartridge and feeding the desired medium, a pickup cartridge having a pickup for recording/reproducing information signals on/from the medium, and a cartridge stocking unit which is provided in the disc apparatus so that both the medium cartridge and the pickup cartridge can be freely pulled out from and put into the cartridge stocking unit, and the disc cartridge and the pickup cartridge can be exchanged for each other.

Further, in order to attain the first object, the medium cartridge and the pickup cartridge are stocked in the cartridge stocking unit so as to be freely pulled out and put in while turned upside down, and the medium cartridge and the pickup cartridge can be exchanged for each other while turned upside down.

Still further, in order to attain the first object, the medium cartridge is provided with a semiconductor memory in which information relating to each medium containing its title information is stored, and the cartridge stocking unit is provided with a detector terminal which is connected to the output terminal of the semiconductor memory to detect information about the interior of the semiconductor memory.

In order to attain the second object of the present invention, a disc apparatus including a disc having a first surface at the obverse side thereof and a second surface at the back side thereof, a disc stocking unit in which a number of discs are stocked, a disc feeding unit for pulling out and feeding a desired disc from the disc stocking unit, a first pickup unit for recording/reproducing the first surface of the disc which is fed by the disc feeding unit, and a second pickup unit for recording/reproducing the second surface of the disc, is characterized by the fact that the disc feeding unit is provided with disc inverting means for inverting the disc so that the first pickup unit records/reproduces information on/from the second surface of the disc, and the second pickup unit records/reproduces information on/from the first surface of the disc.

In order to attain the third object of the present invention, the disc apparatus is provided with medium inclining means for inclining media so as to correct the difference in inclination between media stocked in the medium stocking unit and a medium being fed by the medium feeding unit, and the difference in inclination between the medium being fed by the medium feeding unit and a medium mounted on the pickup unit.

In order to attain the fourth object of the present invention, the medium feeding unit of the disc apparatus has rollers for rotating the medium while pinching the medium therebetween, thereby rotating the medium, and cleaning members are further provided to the rollers to clean the medium through the rotation of the rollers.

BRIEF DESCRIPTION OF THE DRAWINGS

FIGS. 2A and 2B are perspective views each showing a medium cartridge according to the present invention;

DESCRIPTION OF THE PREFERRED EMBODIMENTS

Preferred embodiments according to the present invention will be described with reference to the accompanying drawings. First, a first feature to attain the first object of the present invention will be described with reference to FIGS. 1, 2A, 2B, 3, 4A, 4B, 5, 6 and 7.

Figure 1:
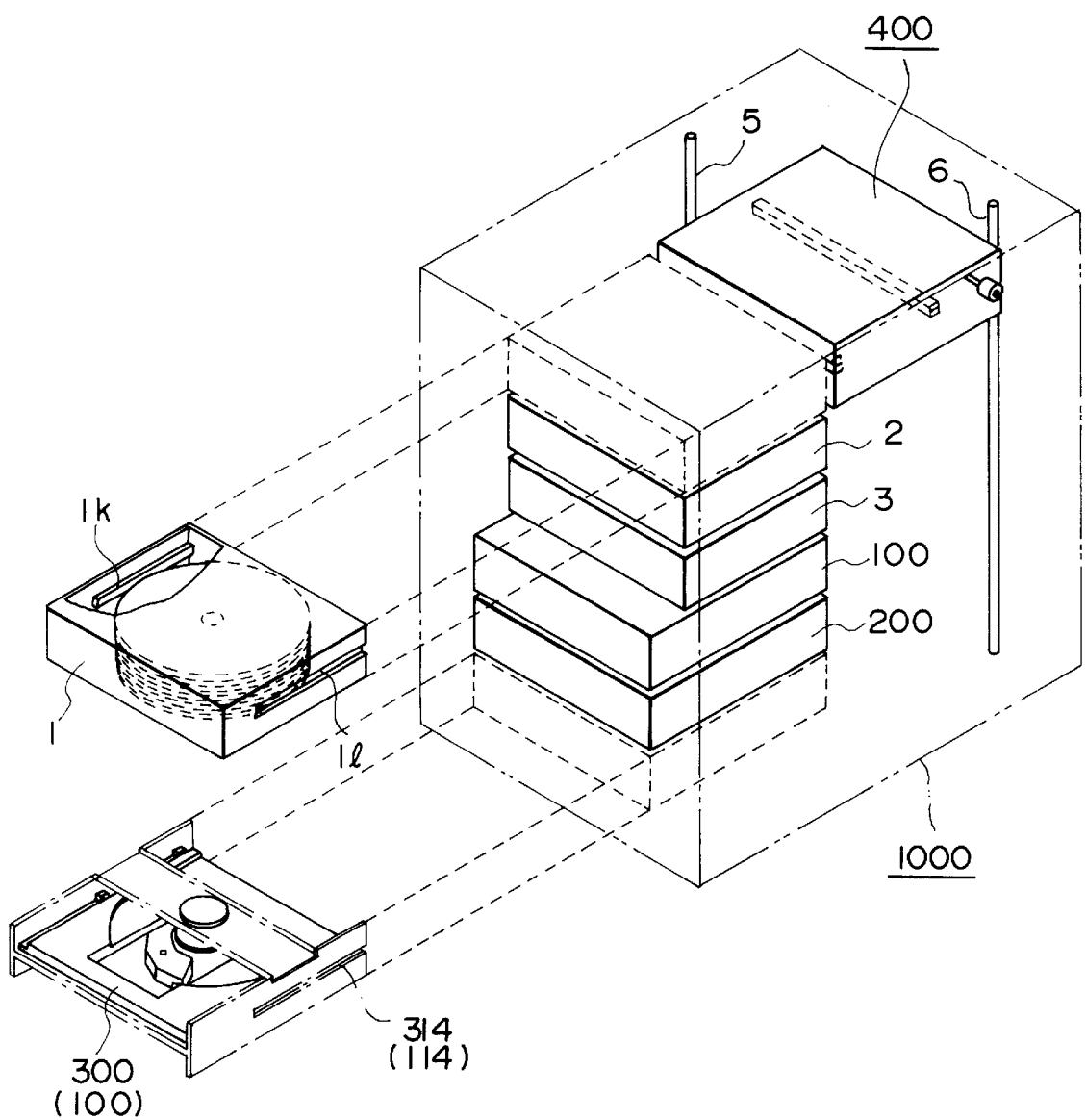
FIG. 1 is a perspective view showing the construction of each cartridge and a disc apparatus according to the present invention.
Figure 6:
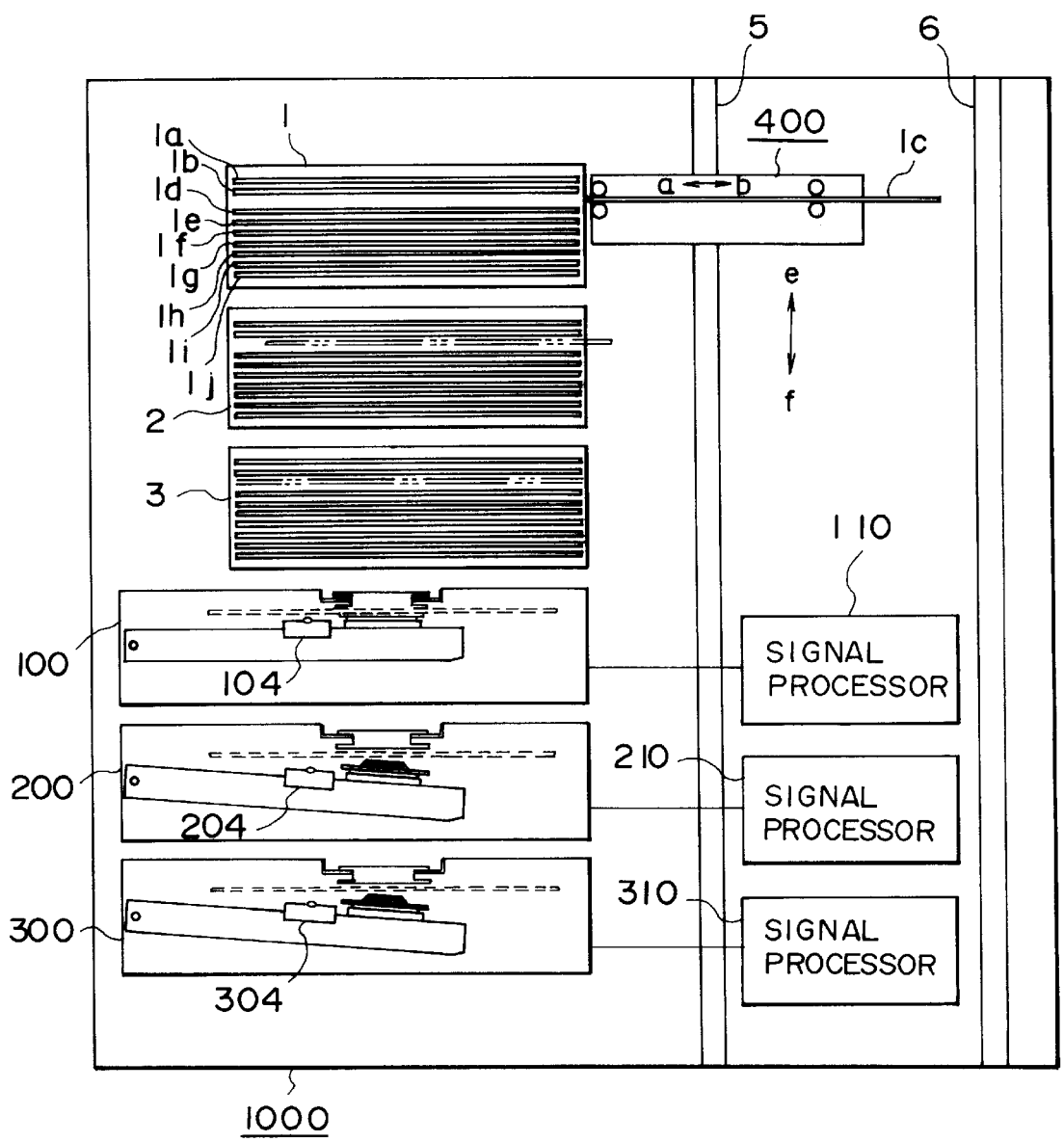
FIG. 6 is a side view showing an embodiment of the disc apparatus according to the present invention.

In FIGS. 1 and 6, reference numerals 1, 2 and 3 represent medium cartridges (disc cartridges), reference numerals 100, 200 and 300 represent pickup cartridges, reference numeral 1000 represents an auto-changer type disc apparatus, reference numeral 400 represents a disc feeder (medium feeder), and reference numerals 5 and 6 represent guide shafts for guiding the feeder 400 in a direction of e or f in FIG. 6. In such a disc apparatus, a desired disc is pulled out from each medium cartridge, and then the disc feeder 400 is moved in the direction of f so that each disc is mounted in each of the pickup cartridges 100, 200 and 300. Therefore, the respective pickups 104, 204 and 304 can simultaneously perform the record/reproduction on these discs to output information signals to respective signal processors 110, 210 and 310. That is, the recording/reproducing operation can be simultaneously performed a number of times equal to the number of pickups mounted in the disc apparatus.

FIGS. 2A and 2B show embodiments of the medium cartridge. Here, medium cartridges are mainly classified into a disc cartridge type 1 shown in FIG. 2A and a case cartridge type 4 shown in FIG. 2B. The disc cartridge 1 stocks a number of optical discs therein. Here, the "optical disc" means a music CD, a video CD, a photo CD, a CD-ROM or a DVD, and it is hereinafter referred to as a "disc". The case cartridge 4 stocks a number of cases 20a each of which covers a disc 4a. Semiconductor memories 1m and 4m are embedded in the cartridges 1 and 4 respectively, and 1o and 4o represent the output terminals of the semiconductor memories 1m and 4m respectively. Further, the cartridge 1 is formed with groove-shaped recess portions 1k and 1/ while the cartridge 4 is formed with groove-shaped recess portions 4k and 4/. These recess portions 1k, 1/ and 4k, 4/ are engaged with projections 713 of a cartridge stocking unit 712 shown in FIGS. 4A and 4B to allow disc cartridges 1, 2 and 3 or case cartridges (not shown in FIG. 4A) to be freely taken out from or put into the disc stocking unit 712. In order to simplify the description, the medium cartridge of this embodiment will be described as the disc cartridge type in which plural discs are stocked, that is, in the form of disc cartridges 1, 2 and 3.

Figure 3:
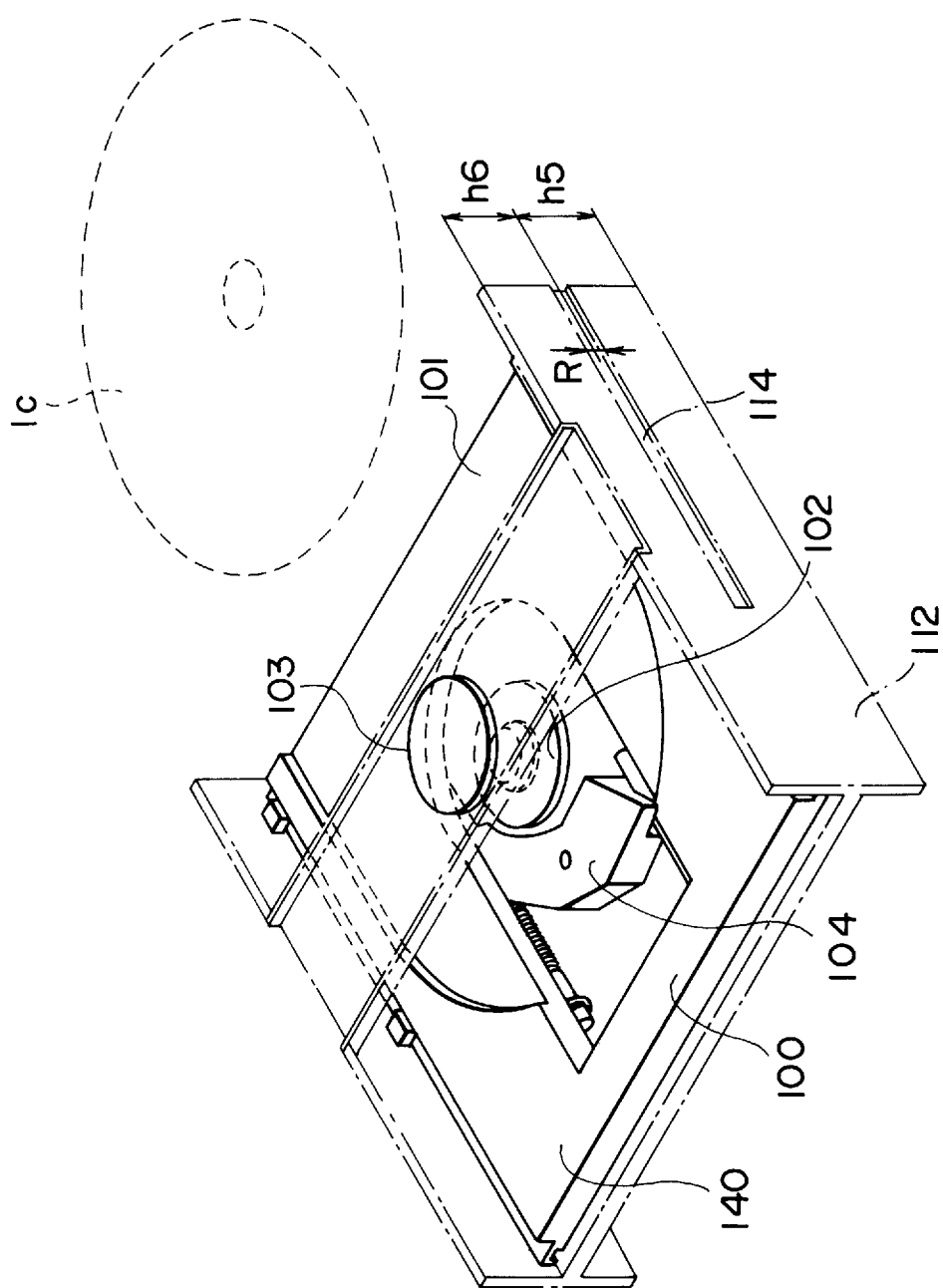
FIG. 3 is a perspective view showing a pickup cartridge according to the present invention.
Figure 5:
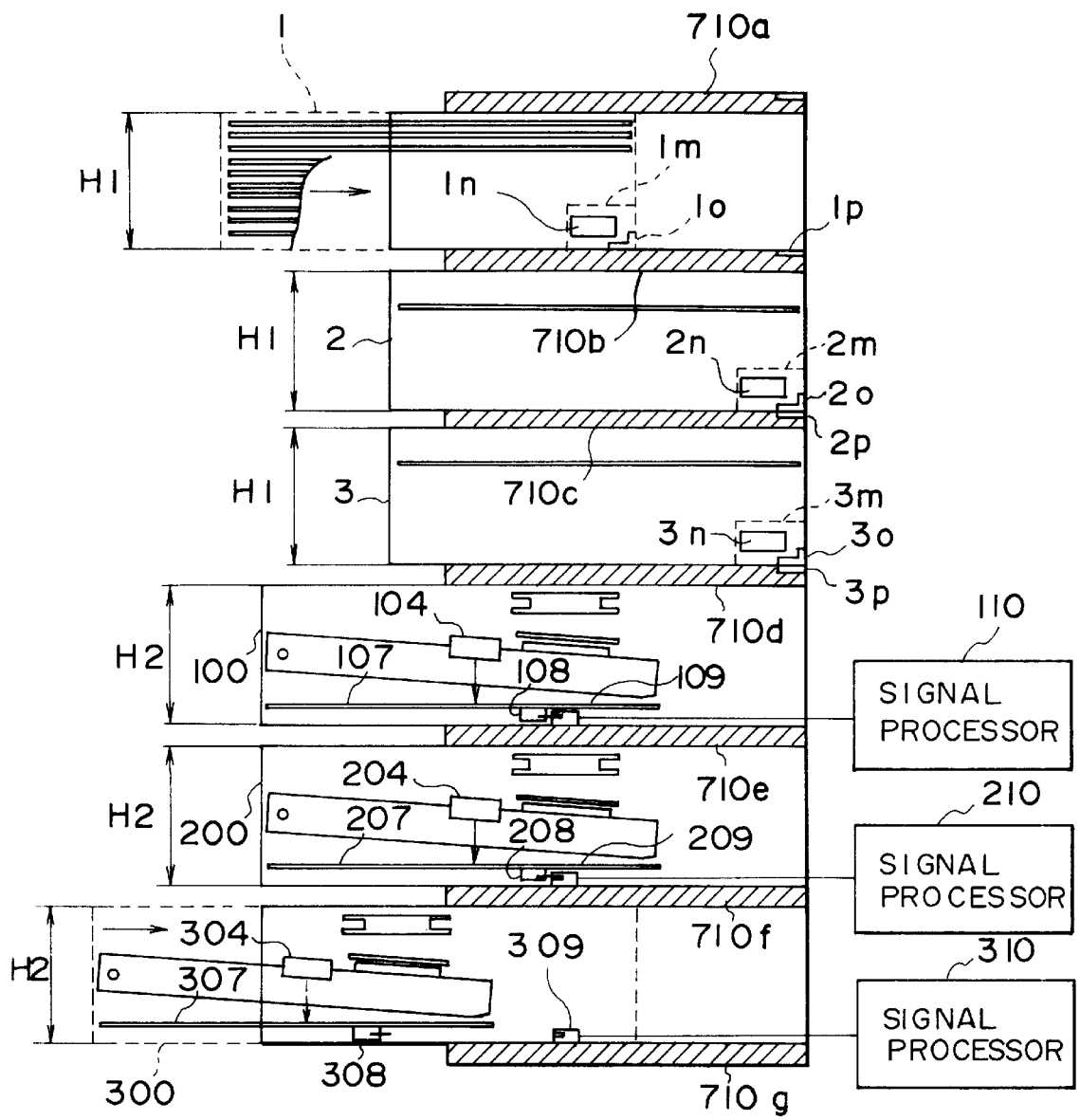
FIG. 5 is a side view showing the mount operation of each cartridge according to the present invention.

FIG. 3 shows an embodiment of a pickup cartridge. As shown in FIGS. 1 and 5, three pickup cartridges 100, 200 and 300 are designed in the same form. Therefore, only one pickup cartridge 100 will be described and the description on the other cartridges 200 and 300 is omitted from the following description.

In FIG. 3, reference numeral 140 represents a tray on which a disc is mounted, reference 101 represents a disc mount portion, reference numeral 102 represents a turn table, reference numeral 103 represents a clamper, and reference numeral 104 represents a pickup for recording and/or reproducing information signals on/from a disc which is rotated at a high speed while being pinched between turn table 102 and the damper 103. The pickup 104 is a multi-pickup which can be suitably used for music CDs, video CDs, photo CDs, CD-ROMs and DVDs. The pickup 104, etc. are mounted on a mechanical base 112 having an H-shaped section. The mechanical base 112 is formed with recess portions 114, 115 (see FIGS. 4A and 4B) having a groove width R which are similar to those of the disc cartridge 1.

Figure 4:
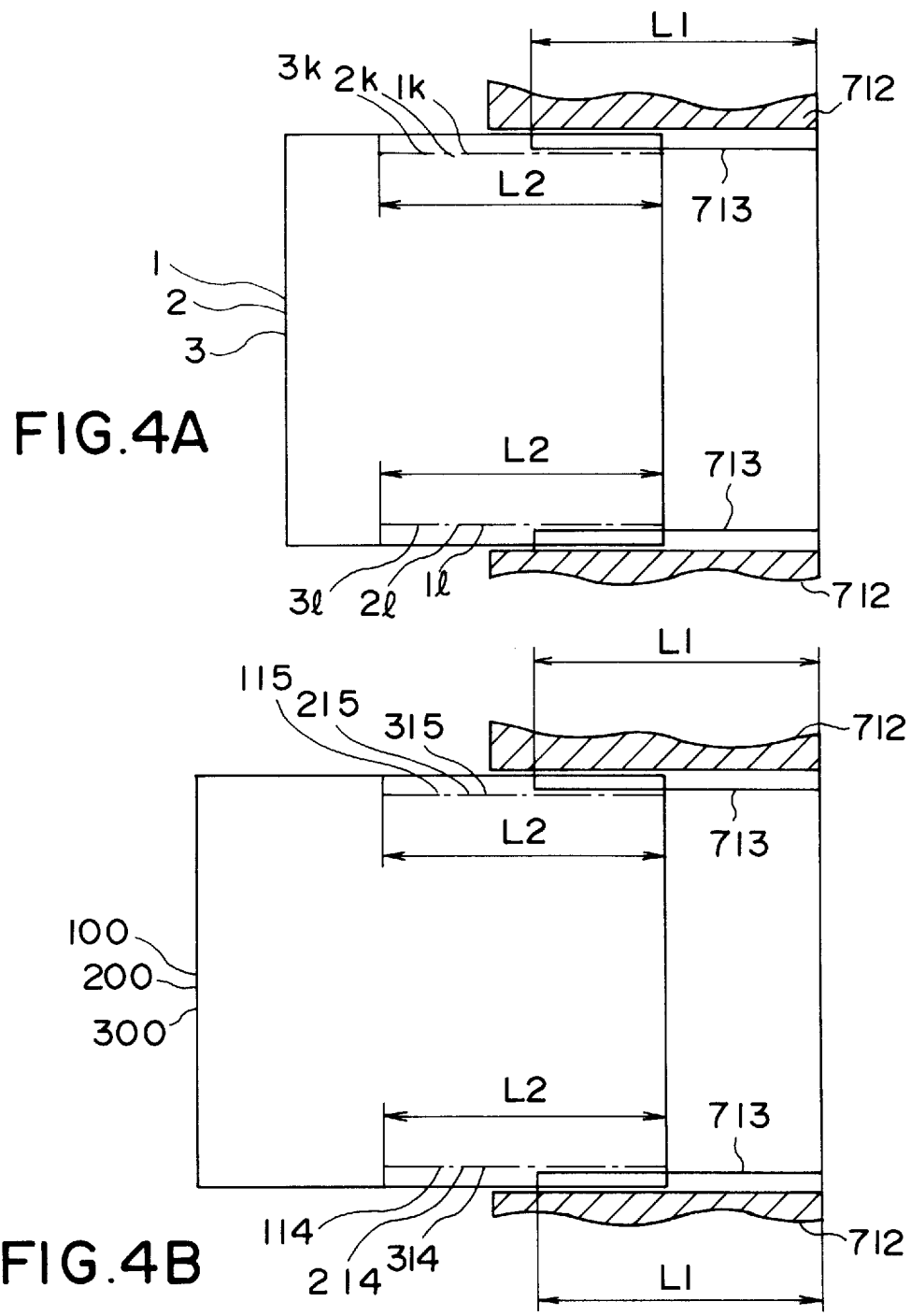
FIGS. 4A and 4B are top views showing a mount operation of each cartridge according to the present invention.

Accordingly, as shown in FIGS. 4A and 4B, the disc cartridges 1, 2, 3 and the pickup cartridges 100, 200, 300 are mounted to be freely taken out from and put into the cartridge stocking unit 712.

In the construction shown in FIGS. 4A and 4B, the length L1 of the projecting portion 713 of the cartridge stocking unit 712 is substantially equal to the length L2 of the recess portions 1k, 1/ of the disc cartridges 1, 2, 3. Further, L1 is substantially equal to the length L2 of the recess portions 114, 115 of the pickup cartridges 100, 200 and 300. As shown in FIG. 5, the height H1 of the disc cartridges 1, 2, 3 stocked in cartridge stocking units 710a, 710b, 710c which are integrally formed with the disc apparatus 1000 is substantially equal to the height H2 of the pickup cartridges 100, 200 and 300 stocked in the cartridge stocking units 710d, 710e, 710f and 710g.

Accordingly, the pickup cartridges 100, 200 or 300 can be accommodated in the space between the cartridge stocking units 710a and 710b in which the disc cartridge 1 is to be inserted and mounted. The disc cartridge 1 is indicated by a dotted line in FIG. 5. Conversely, the disc cartridge 1, 2 or 3 can be accommodated in the space between the cartridge stocking units 710f and 710g in which the pickup cartridge 300 is to be accommodated. That is, each cartridge can be accommodated so as to be exchangeable by another cartridge. Therefore, enlarging of the disc apparatus can be easily achieved by increasing cartridges. Further, even when a music CD reproducing pickup cartridge (not shown) has been mounted in the disc apparatus and it is required to be exchanged for a video CD pickup cartridge (not shown), the exchange work can be simply performed, and the maintenance thereof can also be easily performed.

Figure 7:
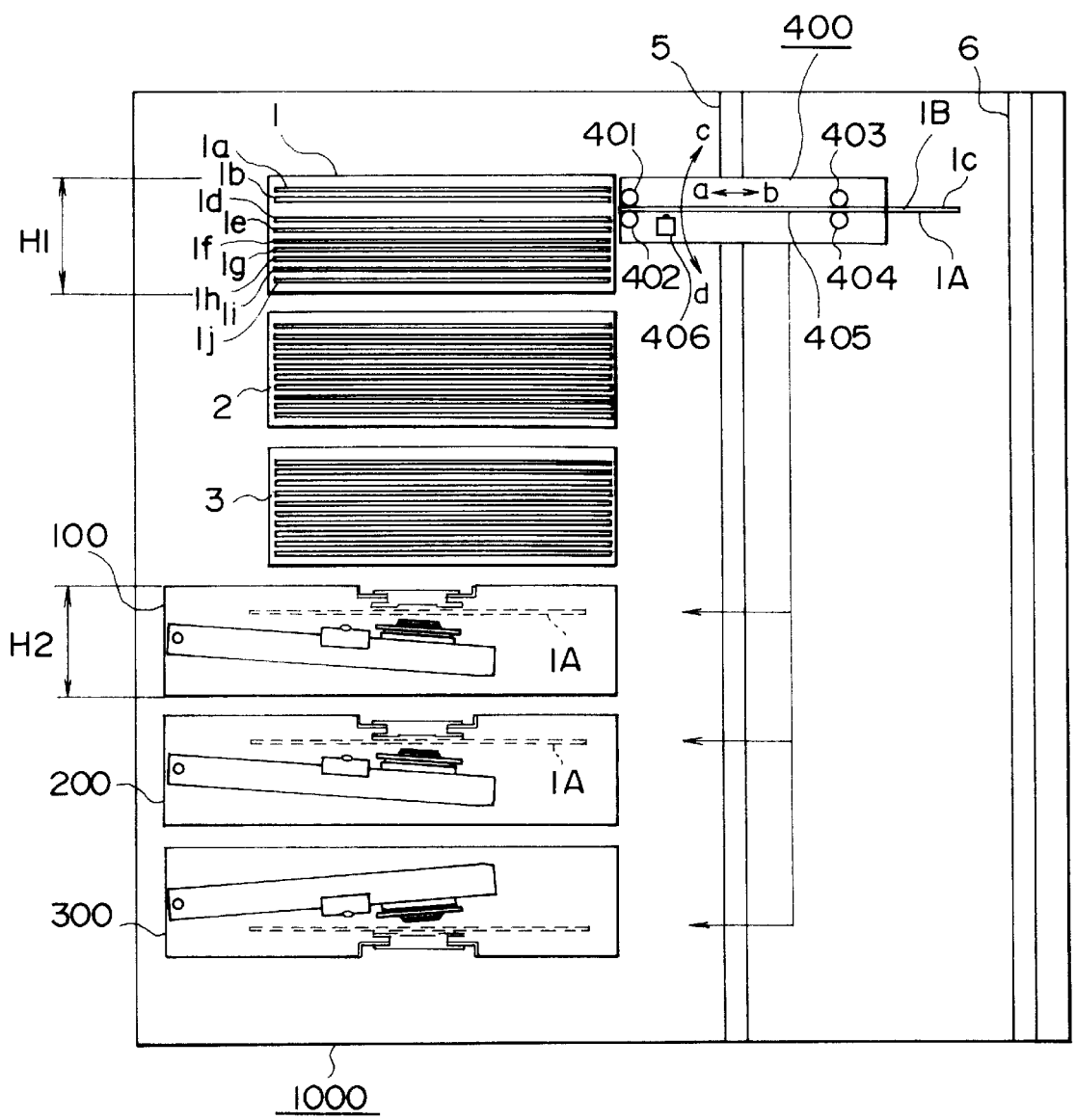
FIG. 7 is a side view showing another embodiment of the disc apparatus according to the present invention.

In addition to the dimensional setting as described above, if the height of the recess portion 114 of the pickup cartridge 100 in FIG. 3 is set to satisfy h5=h6, the pickup cartridge 100 can be pulled out from and put into the disc apparatus while turned upside down (i.e., the obverse and back surfaces of the pickup cartridge 100 are inverted). Therefore, the pickup cartridge 200 and the pickup cartridge 300 can be arranged to face each other as shown in FIG. 7, for example. With this arrangement, the double-side reproduction (i.e, the reproduction from the obverse and back surfaces of a disc) can be easily performed. That is, in the construction shown in FIG. 6, each of the elements 100 and 200 is set to the first pickup cartridge for recording/reproducing the obverse side 1A of the disc, and the element 300 is set to the second pickup cartridge for the back side 1B of the disc, whereby the double-side reproduction of the disc 1C can be performed. The details of the double-side reproduction will be described later.

It is needless to say that the same effect as the inverting operation of the pickup cartridge 300 can be obtained if, in place of the above arrangement, the dimension of the recess portion 1k of the disc cartridge 1 in FIG. 2A is set to satisfy the following arrangement dimension: h1=h2 and the disc cartridge side is turned upside down.

Further, the construction of the cartridge stocking unit will be described with reference to FIG. 5.

In the disc cartridges 1, 2, 3 of FIG. 5, 1m, 2m, 3m represents the semiconductor memory aforementioned, 1n, 2n, 3n represents a memory body of the semiconductor memory, and 1o, 2o, 3o represents a terminal. The cartridge stocking unit 710b, 710c, 710d in FIG. 5 is provided with a detector terminal 1p, 2p, 3p which is contacted with the terminal 1o, 2o, 3o of the semiconductor memory and detects information on the interior of the memory. Accordingly, as shown at the top of FIG. 5, by inserting the disc cartridge 1 as indicated by a dotted line in a direction as indicated by an arrow, the semiconductor memory terminal 1o of the disc cartridge 1 comes into contact with the detector terminal 1p of the cartridge stocking unit, whereby title information of plural discs are allowed to be detected or rewritten.

In the pickup cartridges 100, 200, 300 shown in FIG. 5, reference numerals 104, 204 and 304 represent pickups, reference numerals 108, 208 and 308 represent first connectors secured to circuit boards 107, 207 and 307 respectively, reference numerals 109, 209 and 309 represent second connectors which are secured to cartridge stocking units 710e, 710f and 710g respectively, and reference numerals 110, 210 and 310 represent signal processing circuits which are connected to the second connectors 109, 209 and 309 respectively. In this construction, the first connector 308 and the second connector 309 are coupled to each other by inserting the pickup cartridge 300 as indicated by a dotted line as shown at the bottom of FIG. 5. With this operation, when each of the pickup cartridges 100, 200, 300 is inserted and mounted at a prescribed position, and each disc is mounted as shown in FIG. 6, a signal which is reproduced from each disc by each pickup 104, 204, 304 is input from the circuit board 107, 207, 307 through the second connector 109, 209, 309 to the signal processing circuit 110, 210, 310. In each signal processing circuit, the input signal is subjected to compression and expansion processing, and then the signal thus processed is output.

In the construction shown in FIG. 5, the detector terminal 1p, 2p, 3p is provided to the cartridge stocking unit 710b, 710c, 710d, and the second connector 109, 209, 309 is provided to the other cartridge stocking unit 710e, 710f, 710g. In consideration of the dimensional condition as described above, the cartridge stocking unit is designed so that any one of the disc cartridges and the pickup cartridge can be accommodated in the cartridge stocking unit by exchanging one for the other. Accordingly, the cartridge stocking unit may be designed so that both the detector terminal and the second connector are integrally formed in each cartridge stocking unit (not shown).

Next, the double-side reproduction which is a second feature of the present invention will be described with reference to FIG. 7.

In FIG. 7, double-side discs 1a to 1j (for example, DVDS) are stocked in the disc cartridge 1 which is inserted and mounted in the disc apparatus 1000. Accordingly, the disc 1c which is being fed by the disc feeder 400 has a first surface 1A and a second surface 1B. Reference numeral 100, 200 represents the first pickup cartridge (pickup unit), and records/reproduces information on/from the first surface 1A of a disc. Reference numeral 300 represents the second pickup cartridge (pickup unit), and records/reproduces information on/from the second surface 1B of a disc.

Reference numeral 400 represents the disc feeder, and it comprises two pairs of rollers 401, 402 and 403, 404, each pair pinching a disc therebetween, a disc moving mechanism (not shown) for rotating the rollers to move the disc in a direction as indicated by "a" or "b" in FIG. 7, and a disc inverting means (not shown in FIG. 7) for inverting the disc around a supporting point 405 in a direction as indicated by "c" or "d" in FIG. 7. Reference numeral 406 represents obverse/back surface identifying means (see FIG. 10), and it is positioned at the lower side of the disc 1c to identify one of the obverse and back surfaces of the disc. The disc feeder 400 is guided in a vertical direction along the guide shafts 5 and 6, and moved upwardly and downwardly by driving means (not shown in FIG. 7).

It is now assumed that an instruction of the recording/reproducing operation on/from the discs 1a and 1b stocked in the disc cartridge 1 in FIG. 7 is applied. At this time, the disc feeder 400 is actuated to feed the disc 1a as indicated by a solid line of FIG. 7 to the position as indicated by a dotted line of FIG. 7. Accordingly, the recording/reproducing operation is performed on the first surface 1A of the disc 1a in the first pickup cartridge 100. Likewise, the disc 1b is also fed into the first pickup cartridge 200 by the disc feeder 400, and thus the recording/reproducing operation is performed on the first surface 1A of the disc 1b in the first pickup cartridge.

When an instruction for the recording/reproducing operation on/from the first surface of the disc 1c is newly applied in the above state, the disc feeder 400 feeds the disc 1c to the position of the second pickup cartridge 300 as indicated by the dotted line of FIG. 7, however, the recording/reproducing operation cannot be performed on/from the first surface 1A of the disc 1c because the second pickup cartridge 300 is used exclusively for the recording/reproducing operation on/from the second surface 1B. Therefore, in this case, the above instruction cannot be satisfied.

Therefore, according to the present invention, when an instruction for the recording/reproducing operation on/from the first surface 1A of the disc 1c is applied, the disc inverting means (not shown in FIG. 7) of the disc feeder inverts the disc 1c in the direction as indicated by "c" or "d" by 180°, whereby the second pickup cartridge 300 is allowed to perform the recording/reproducing operation on/from the first surface 1A.

Further, the present invention is also characterized in that the disc inverting means is designed not only to invert the disc, but also to incline the disc. This third feature of the present invention will be described in detail with reference to FIGS. 8 and 9.

As shown in FIGS. 4A and 4B, each of the disc cartridges and the pickup cartridges is provided with recess portions, and projections are provided to the cartridge stocking unit into which the disc or pickup cartridge is inserted. With this construction, each cartridge is freely pulled out from and inserted into the cartridge stocking unit, and is freely exchangeable for another cartridge.

However, this construction needs a prescribed clearance (gap) between the recess portion and the projection to stably pull out/insert each cartridge from/into the cartridge stocking unit. Further, some inclination occurs (difference in orientation) among the discs (indicated by the dotted lines) mounted in the respective pickup cartridges 100, 200, 300, the discs (indicated by the solid lines) stocked in the respective disc cartridges 1, 2, 3 and the disc 1c being fed by the disc feeder 400, due to warp of resin parts constituting the respective disc cartridges 1, 2, 3, clearance between bearings and the guide shafts 5 and 6 which constitute the disc feeder 400, etc. When this inclination is accumulated and intensified, the pickup cartridge 100 and the disc cartridge 1 are finally oriented so that the surfaces thereof intersect each other at an angle (i.e., the surfaces are not parallel to each other) as shown in FIG. 8.

Figure 9A:
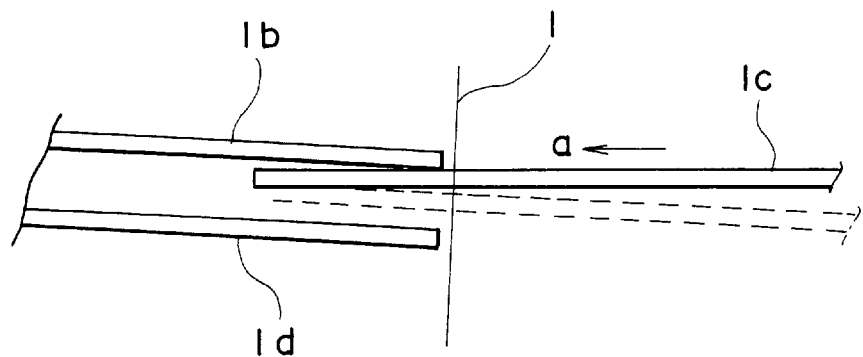
FIGS. 9A and 9B are conceptual diagrams showing the operation of disc inclining means according to the present invention.

Particularly when there is a large inclination between the discs stocked in the disc cartridge 1 and the disc 1c being fed by the disc feeder 400, the disc 1c (as indicated by the solid line) which is returned to the disc cartridge 1 in the direction as indicated by an arrow "a" abuts against the neighboring discs 1b and 1d stocked in the disc cartridge 1 as shown in FIG. 9A. In the worst case, the disc 1c cannot be returned into the disc cartridge 1.

Figure 9B:
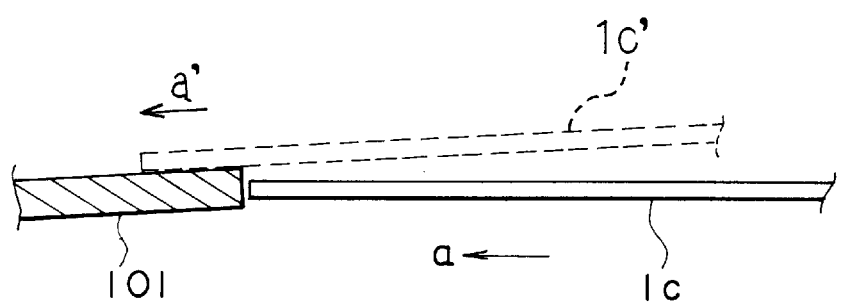

Therefore, according to the present invention, the disc 1c (as indicated by the solid line in FIG. 9A) which is being returned is inclined as indicated by a dotted line. That is, the disc 1c is inclined so that the surfaces of the disc 1c and the discs 1b and 1d are substantially parallel to each other, whereby the above problem can be solved. Likewise, the disc 1c as indicated by a solid line of FIG. 9B is inclined as indicated by a dotted line, so that the disc 1c, indicated by the solid line of FIG. 9B, which is in a process of being returned, parallels a position 1c', indicated by a dotted line of FIG. 9B, which is to be mounted on the upper surface of the disc mount portion 101 of the tray, and then being moved in a direction "a" so as to be mounted at a predetermined position of the pickup cartridge (not shown). Therefore, the disc 1c which is inserted into the pickup cartridge (not shown) can be prevented from abutting against the disc mount portion 101 constituting the pickup cartridge. In other words, the disc inclining means inclines the disc so as to correct the difference in inclination between the disc being fed by the disc feeder 400 and the disc to be inserted into and mounted on the pickup cartridge. This is the third feature of the present invention.

Figure 8:
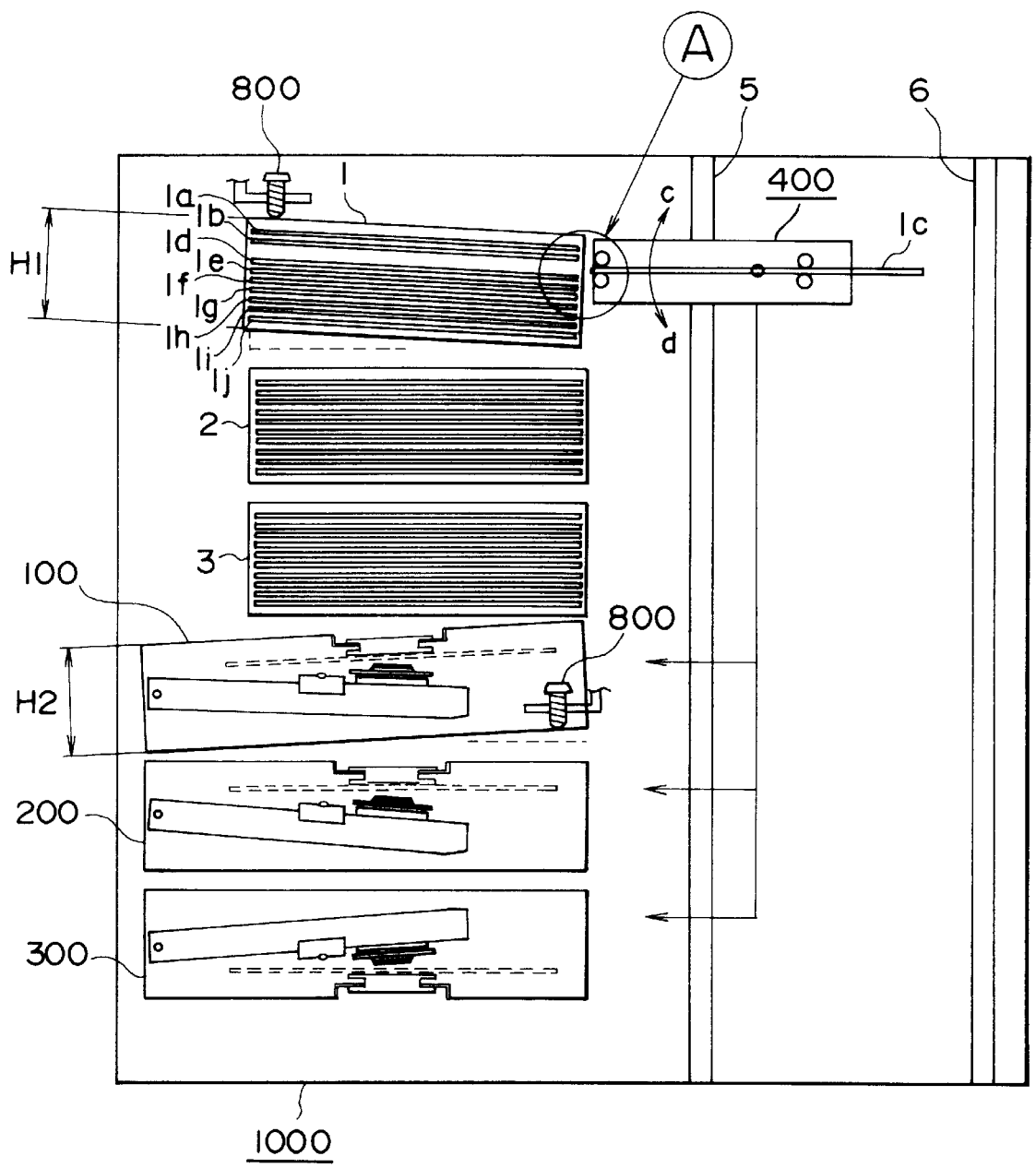
FIG. 8 is a side view exaggerating a problem in the construction of FIG. 7.

In order to attain the above object, according to the present invention, there is provided a disc inclining means for inverting and inclining the disc 1c in the "c" or "d" direction in the disc feeder 400 as shown in FIG. 8. The disc inclining means may be designed in the same construction as the disc inverting means as described above, and thus the functions of the disc inclining means and the disc inverting means can be attained by a single mechanism.

In the disc apparatus having the construction shown in FIG. 8, the pickup cartridges are divided into the first pickup cartridges 100 and 200 and the second pickup cartridge 300 in order to smoothly and continuously link the description of FIG. 8 to that of FIG. 7. However, the same effect can be also obtained by the construction shown in FIG. 6 in which the pickup cartridge 300 is not inverted. Further, in the disc apparatus as described above, the disc inclining means or the disc inverting means is provided in the disc feeder 400. However, the same effect can be also obtained in the following construction. That is, as shown in FIG. 8, the disc feeder 400 is designed so that the disc 1c in the disc feeder 400 is not inclined, that is, merely inverted, and the inclined disc cartridge 1 is adjustable to be moved to the position as indicated by a dotted line by a screw 800 which is brought into contact with the disc cartridge 1 or the inclined pickup cartridge 100 in FIG. 8 is adjustable to be moved to the position as indicated by a dotted line by the same screw 800.

Next, an embodiment of the disc feeder 400 will be described in detail with reference to FIG. 10, and in addition the fourth feature of the present invention will be described.

Figure 10:
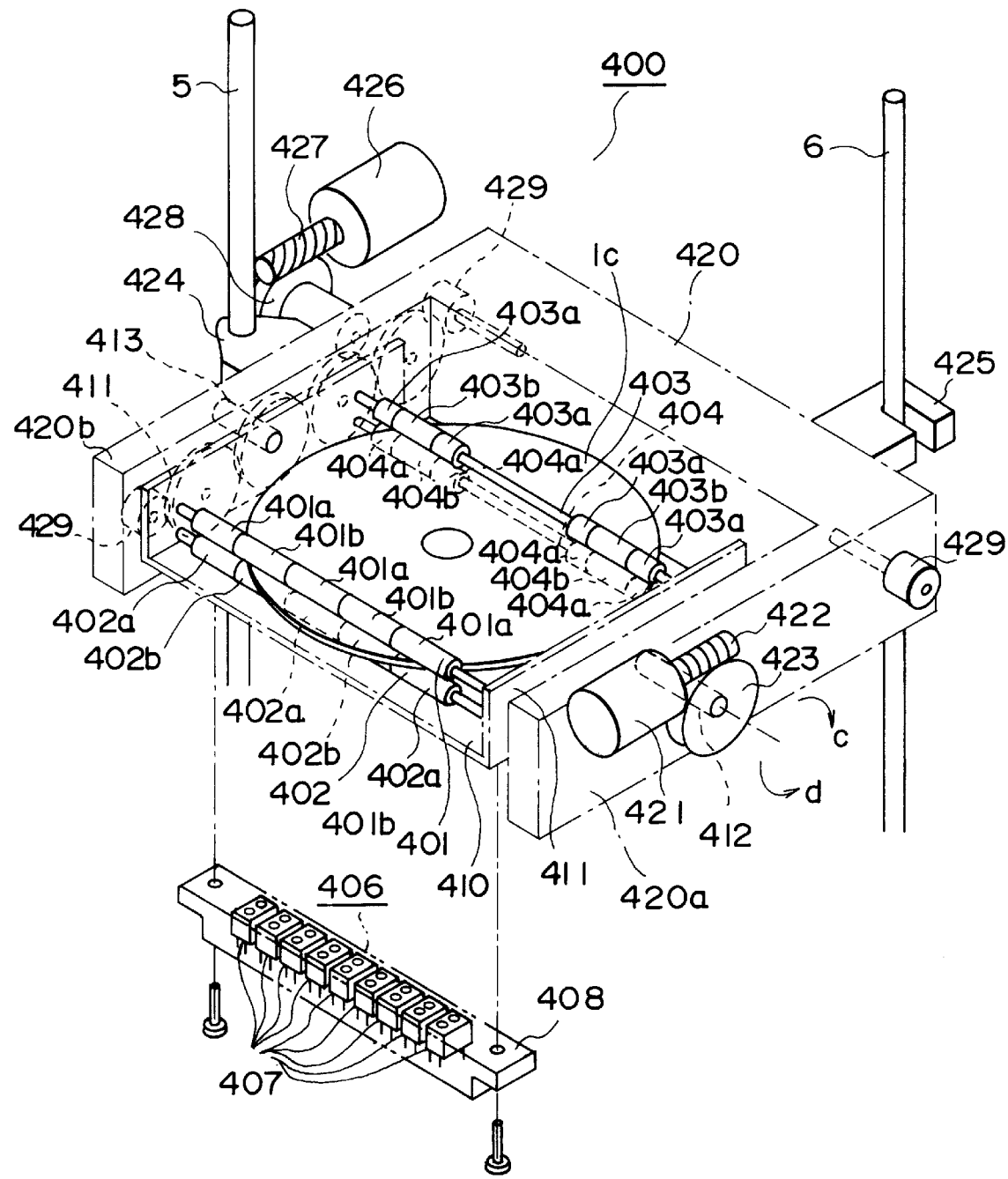
FIG. 10 is a perspective view showing an embodiment of a disc feeding unit according to the present invention.

In FIG. 10, reference numeral 1c represents the disc, and the disc 1c is pinched and held by the two pairs of four rollers 401, 402 and 403, 404. The roller 401 comprises an assembly of first rollers 401a formed of rubber rollers suitable for pinching and holding the disc, and second rollers 401b which have substantially the same diameter as the first rollers, and formed of cleaning members suitable for cleaning the surface of the disc, the first and second rollers being alternately arranged. The other rollers 402, 403 and 404 have the same structure. Therefore, the same elements are represented by the same reference numerals, and the duplicative repeat is omitted.

These four rollers 401, 402, 403 and 404 are supported at both ends thereof by confronting side plates 411 so as to be freely rotatable, and rotated by a roller driving means (not shown). Accordingly, the disc 1c can be horizontally moved by the rotation of the respective rollers, and the surface of the disc is cleaned by the second rollers 401b to 404b through the rotation of these rollers so that no dust or mote is attached onto the surface of the disc.

In this embodiment, the respective rollers 401, 402, 403 and 404 are divided into the first and second rollers. However, these rollers may be integrally formed of a member which is suitable for pinching and holding the disc, and also suitable for cleaning the surface of the disc.

Furthermore, the obverse/back identifying means 406 shown in FIG. 10 is disposed at the lower side of the disc 1c. The obverse/back identifying means 406 comprises an array of plural sensors 407 arranged in a row, each of which comprises a light emitting device (LED) for irradiating a light beam onto the disc 1c and a photodetector for receiving a light beam reflected from the disc 1c. The respective sensors 407 are integrated in a sensor holder 408, and fixed to a holding plate 410.

Accordingly, while the disc 1c is horizontally moved by the disc feeder, each sensor 407 detects color difference and light and shade on the basis of the difference in reflectivity and outputs a detection signal. The detection signal is compared with a reference signal to identify the obverse/back surface of the disc. Accordingly, even when a music CD (no reference numeral) mounted in the disc cartridge 2 in FIG. 7 is turned upside down for some reason, the obverse/back identifying means 406 identifies the obverse/back surface of the disc. In this case, the music CD is mounted in the second pickup cartridge 300, or the disc inverting means of the disc feeder 400 is actuated to invert the music CD so that it is allowed to be reproduced, and the CD is mounted in the first pickup cartridge 100 or 200. Therefore, the reproducing operation can be surely performed without paying attention to the inversion of the disc 1c.

In FIG. 10, reference numeral 420 represents a mechanical chassis. The mechanical chassis 420 is molded in a U-shaped form to face inner side walls thereof with the respective outer surface of the side plates 411, and has arm pieces 420a and 420b. Pins 412 and 413 are provided to the side plates 411 respectively so as to be projected outwardly. The pin 412 penetrates through a hole formed in the arm piece 420a of the mechanical chassis, and then linked to a worm wheel 423. The other pin 413 is supported while penetrating through a hole formed in the arm piece 420b of the mechanical chassis.

Accordingly, the side plates 411 are guided so as to be freely rotatable in the direction of "c" or "d" around the pins 412 and 413 respectively. The rotational center of each of the pins 412 and 413 is arranged on a straight line passing the rotational center of the disc, whereby the disc 1c is inverted by rotating the side plates 411 by 180°.

Reference numeral 421 represents a motor serving as a driving source for rotating the side plates 411, reference numeral 422 represents a worm, and reference numeral 423 represents the worm wheel as described above. The motor 421, the worm 422 and the worm wheel 423 constitute the disc inverting means for inverting the disc 1c. Here, the inclined angle of the side plates 411 can be varied by suitably adjusting the inclined angle of the motor 421, and thus the disc inverting means may function as the disc inclining means.

In the mechanical chassis 420, reference numerals 424, 425 represent bearings which are engaged with the guide shafts 5 and 6, and serve to guide the mechanical chassis upwardly and downwardly. Reference numeral 426 represents a motor serving as a driving source for moving the mechanical chassis 420 upwardly and downwardly, reference numeral 427 represents a worm, reference numeral 428 represents a worm gear, and reference numeral 429 represents a pinion which is engaged with a rack (not shown) to drive the chassis 420 upwardly and downwardly.

As described above, according to the disc apparatus of the present invention, the cartridge stocking unit is provided so that the disc cartridge for stocking plural discs therein and the pickup cartridge having the pickup, etc. are freely pulled out from and put into the disc apparatus, thereby facilitating the extension, maintenance and exchange of the respective cartridges. Therefore, a disc apparatus which is excellent in operation performance and convenient for users can be provided.

Furthermore, in order to perform the double-side reproduction by using the confronting first and second pickup cartridges, the pickup cartridge is inverted and then put into the disc apparatus while turned upside down. The disc inverting means is designed to invert the disc and then mount the disc in the first or second pickup cartridge, so that the double-side reproduction can be surely performed even by using plural pickup cartridges.

Still further, the disc inclining means for inclining the disc is provided, and even when a large inclination occurs (different in orientation) between the discs mounted in the disc cartridge, and the disc being fed by the disc feeder, the disc inclining means inclines the discs so that the inclined disc is oriented horizontally. Therefore, the pull-out/put-in operation of the disc from/into the disc feeder portion or the disc cartridge can be stabilized. In addition, the disc inclining means and the disc inverting means are constructed by a single member, and the price of the disc apparatus can be reduced.

Still furthermore, the cleaning member is provided for some or all of the rollers for feeding the disc to perform the cleaning operation as well as the disc feeding operation. Therefore, no dust is attached onto the surface of the disc, and the recording/reproducing operation can be performed while maintaining excellent recording/reproducing characteristics.

What is claimed is:

1. A disc apparatus including:

a disc stocking unit in which a number of discs are stocked;

a disc feeding unit for pulling out a disc from said disc stocking unit and feeding the disc;

a first pickup unit for recording/reproducing a first surface of the disc fed by said disc feeding unit; and a second pickup unit for recording/reproducing a second surface of the disc fed by said disc feeding unit;

a combined disc inverting/disc inclining means, within said disc feeding unit, for inverting the disc so that said first pickup unit records/reproduces information on/from the second surface of the disc and said second pickup unit records/reproduces information on/from the first surface of the disc and for correcting a difference in inclination between at least one disc in said disc stocking unit and a disc being fed by said disc feeding unit into said disc stocking unit, and a difference in inclination between a disc being fed by said disc feeding unit into one of said first and second pickup units and a mounting position of said one of said first and second pickup units, wherein the combined disc inverting/disc inclining means includes a mounting device on which a disc received by the disc feeding unit is mounted and means for either inverting or inclining the mounting device on which the disc is mounted.

2. A disc apparatus according to claim 1, wherein the means for either inverting or inclining the mounting device includes a common motor and a common shaft coupled to the mounting device.

* * * * *